United States Patent [19]
Lofgren et al.

[11] Patent Number: 5,853,184
[45] Date of Patent: Dec. 29, 1998

[54] HANDCYCLES

[76] Inventors: Michael S. Lofgren, 20589 SW. Elkhorn Ct., Tualatin, Oreg. 97062; Brian C. Stewart, 17915 S. Strowbridge Rd., Estacada, Oreg. 97045

[21] Appl. No.: 604,798

[22] Filed: Feb. 23, 1996

[51] Int. Cl.⁶ ..................................... B62M 1/14
[52] U.S. Cl. ................. 280/242.1; 280/250; 280/266
[58] Field of Search .................. 280/242.1, 243, 280/249, 250, 266, 265, 263, 287, 278, 288.1, 112.2, 112.1, 111, 716; 267/139, 140

[56] References Cited

U.S. PATENT DOCUMENTS

| | | | |
|---|---|---|---|
| 3,910,599 | 10/1975 | Thomas | 280/236 |
| 4,109,927 | 8/1978 | Harper | 280/242.1 |
| 4,432,561 | 2/1984 | Feikema et al. | 280/288.1 |
| 4,502,705 | 3/1985 | Weaver | 280/242.1 |
| 4,572,535 | 2/1986 | Stewart et al. | 280/266 |
| 4,789,173 | 12/1988 | Lofgren et al. | 280/288.1 |
| 5,060,962 | 10/1991 | McWethy | 280/250.1 |
| 5,183,129 | 2/1993 | Powell | 280/287 |
| 5,354,084 | 10/1994 | Lofgren et al. | 280/250 |
| 5,419,539 | 5/1995 | Bressler | 267/140 |
| 5,501,480 | 3/1996 | Ordelman et al. | 280/304.1 |

*Primary Examiner*—Paul N. Dickson

[57] ABSTRACT

A hand-powered vehicle with a device for positioning the crank arms so that the rider can easily adjust them for both vertical and horizontal movement and placement. A device for supporting the rider's legs and feet that combines both a leg support and footrest that can be adjusted forward and rearward relative to the front wheel to accommodate different rider leg lengths. A device for triangulating the frame behind the seat in order to increase frame rigidity between the crank arms and the seat back. A self tightening seat with fabric attached in such a manner that the rider's weight holds the seat frame attached to the frame of the cycle. A device for quickly removing and replacing the rear axle while maintaining proper toe in and toe out of the rear wheels. A device for lowering the structure of the frame below the axis of the front wheel for the purpose of lowering the center of gravity of the bike and rider.

13 Claims, 5 Drawing Sheets

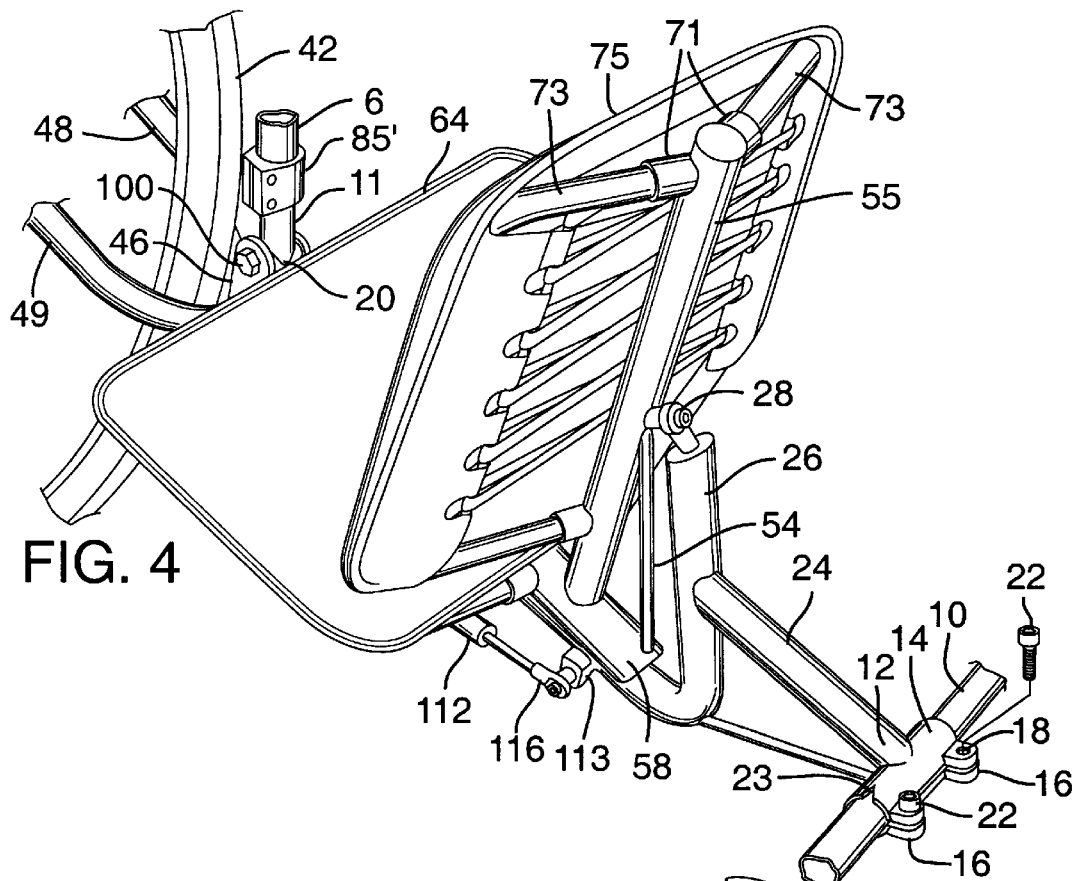
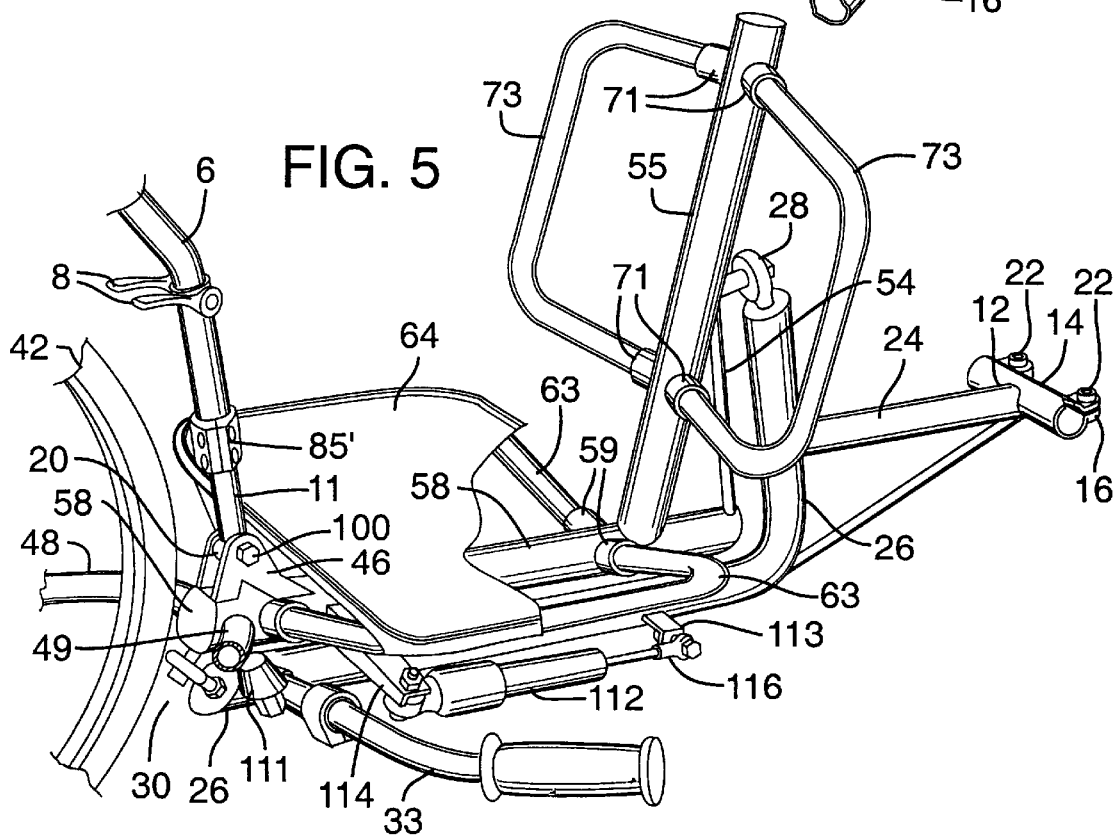

HANDCYCLES

FIELD OF THE INVENTION

The sport of handcycling is advancing quickly. Our previous developments in this field have allowed paraplegics and others who are missing their legs or have impaired use of their legs to do things that were previously thought impossible. In 1995 three athletes used FREEDOM RYDERS which incorporate the inventions herein described to handcycle completely around the world. They made this 13,000 plus mile trip in just eight months averaging a staggering fifty five miles every single day even though there were many days that they didn't ride at all. All of these ideas vastly improve handcycling in general. They are not limited to one particular design but improve the rideability of any vehicle that is hand-powered.

BACKGROUND OF THE INVENTION

A three-wheel vehicles based on the concept of hand propulsion for individuals with certain limitations that prevent the use of their legs, is known, as exemplified by the U.S. Pat. No. 5,354,084 issued to the same inventors hereof, as well as U.S. Pat. No. 4,109,927 issued to Harper. The vehicles of these U.S. Patents function very well for their intended purpose. However, it is desirable to make subtle but very important refinements to the present state of hand propulsion technology to provide increased rider comfort, safety and stability. These improvements reach across the many styles of handcycles that are now available and address the ergonomic needs of the operator. The need for the operator to be low to the ground for increased stability was addressed in our earlier U.S. Pat. No. 5,354,084. With the present invention we have analyzed the rider's total body position and sculpted the handcycle around the operator to maximize comfort, accessibility and safety. The invention provides a means for locating the hand-cranks virtually anywhere within a defined border of movement, providing also a means to increase or decrease the scope and shape of the border of movement without altering the wheelbase of the handcycle. The invention provides a means for supporting and protecting the rider's legs and feet simultaneously while providing adjustment to accommodate different size riders. The invention provide for a seat and backrest that is maintained in place on the handcycle by the rider's own weight and body position. In the case of a body-lean handcycle the invention provides an adjustable bumper on bilateral sides of the bike's center line to limit articulation of the frame within desired parameters. Thus preventing overleaning and bottoming of the steering dampener (disclosed in U.S. Pat. No. 5,354,084). The invention provides a means for triangulating and thus stiffening the frame behind the seat and between the backrest and the handcranks in order to transfer the rider's arm power directly to the cranks, front wheel and ultimately vehicle acceleration without loosing power to frame flex. This is very important for both acceleration and hill climbing. The invention provides a means for quickly and accurately positioning the rear axle so as to simultaneously center the axle and maintain the proper amount of toe-in and toe-out. The invention provides a means for placing the main structure of the frame below the axis of the front wheel to provide the lowest possible center of gravity for the rider and vehicle. The invention herein is directed to the satisfaction of all the above objectives.

BRIEF DESCRIPTION OF THE INVENTION

The present invention solves all of the above objectives. Whereas in the prior vehicles different rider size and riding style was difficult to adjust for or the adjustments were always limited in someway the present invention offers the rider almost unlimited adjustability. The handcranks are mounted to a structure that includes a combination of telescoping sections, linkage arms and pivot points that form an approximate triangular shape. This shape allows the cranks to be moved about both up and down independently of the forward and rearward adjustment, forward and rearward independently of the up and down adjustment or both vertically and horizontally simultaneously for differing arm lengths and/or rider height and then be locked rigidly into place once the desired position is located. In previous hand powered vehicles the adjustment of the location of the cranks for rider use was limited to telescoping the frame in and out or telescoping the cranks in and out of a fixed inner and outer cylinder arrangement that limited the crank arm adjustment to linear movement only.

The present invention also recognizes the need for support of both the rider's legs and feet and not just the rider's legs in a cradle type device. The present invention provides a wrap around style of footrest and leg support that telescopes forward and rearward on the mainframe to accommodate different leg lengths. By wrapping around the rider's foot the footreat-leg support combination keeps the rider's foot from flopping to the side while at the same time supporting the leg. This type of support also provides protection to the rider's feet and legs from collision or side impact. Previous handcycles left the rider's feet to dangle in front of the front leg support.

The present invention also provides structural triangulation of the vehicle frame at the crank location as mentioned above as well as behind the seat. Triangulation of the frame in these two areas provides a stiff frame between the backrest and the crank arms so rider power is delivered directly to the crank arms and not lost in frame flex. For optimal riding, stiffness in the frame is required between the backrest and the cranks only and thus has no effect on the overall ride of the vehicle. The rubber snubbers in conjunction with the cantilevered rear axle act to absorb impact caused by drought terrain providing an overall smooth ride to the operator of the vehicle.

The present invention provides a means of affixing a tubular and fabric sling seat to the handcycle's main frame for the backrest and seat bottom. A pair of "U"-shaped tubes are inserted into a pair of receiving tubes on the front frame in such a manner that the rider's weight on the fabric sling material holds the backrest and seat bottom in place while the vehicle is being ridden.

The present invention provides a means of quickly centering and aligning the rear axle for toe-in and toe-out. A "V" shaped notch is made in the axle clamp tube on the rear frame. A small roll-pin is located in the axle after the axle has been aligned for proper toe-in and toe-out. When the rear axle is located in the axle clamp the roll pin bottoms out in the "v" shaped notch leaving the rear wheels both centered and properly adjusted.

The invention provides a means of limiting frame articulation in the case of body-lean handcycles by placing adjustable rubber snubbers on the left and right side of the longitudinal axis of the handcycle. These rubber snubbers when properly adjusted stop the articulation of the frame before maximum extension or compression of the steering stabilizer can occur.

DETAILED DESCRIPTION OF THE PREFERRED EMBODIMENT

The following drawings and detailed description are intended to incorporate by reference the figures and drawings of previous U.S. Pat. No. 4,572,535 and U.S. Pat. No. 5,354,084.

FIG. 4 is detailed perspective view of the axle clamping mechanism and seat assembly.

FIG. 5 is detailed perspective view of the seat assembly, lower crank arm adjustment flange assembly, telescoping section and rubber bumper.

Figure 1:
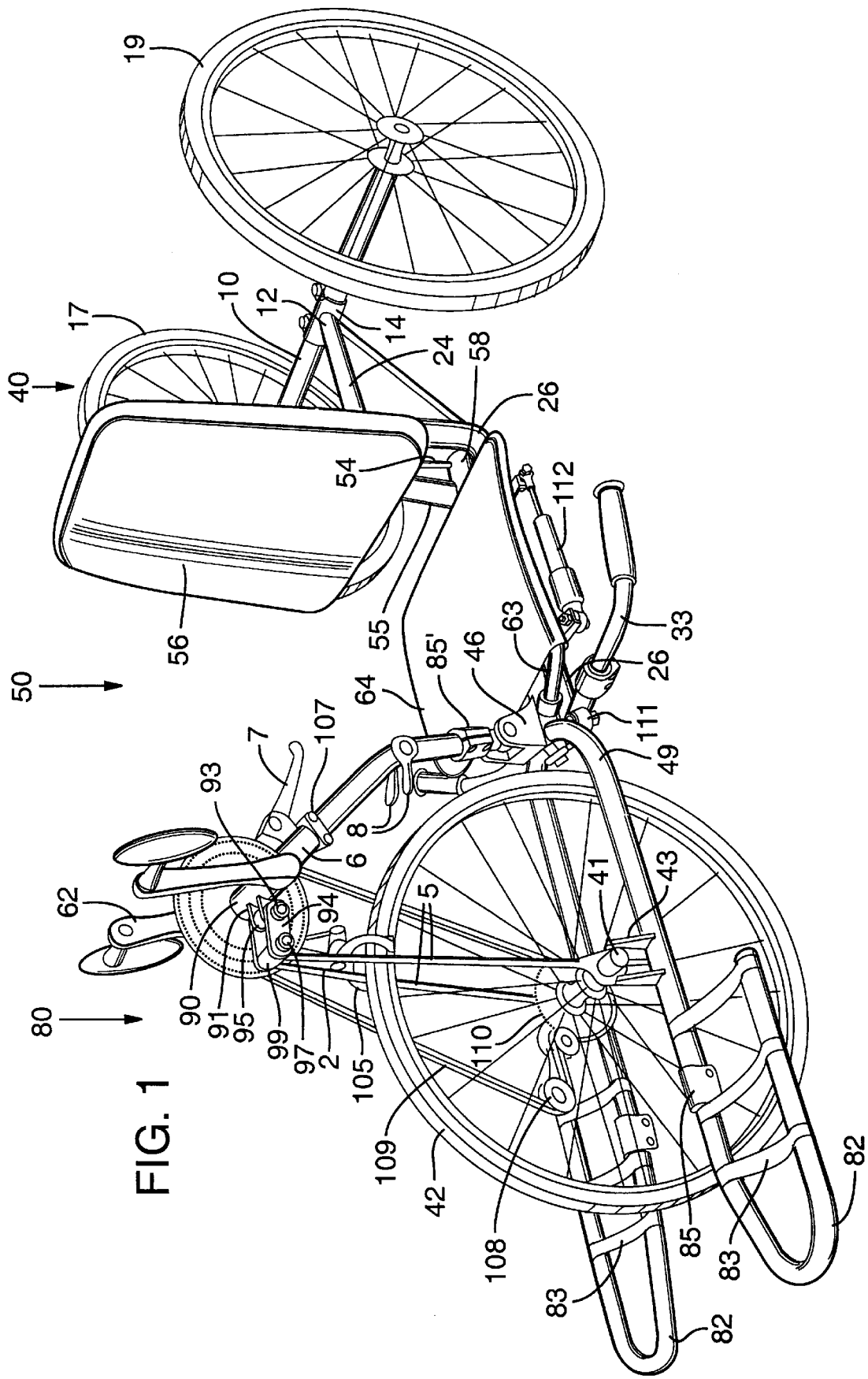
FIG. 1 is a perspective view of the handcycle in accordance with the present invention.
Figure 2:
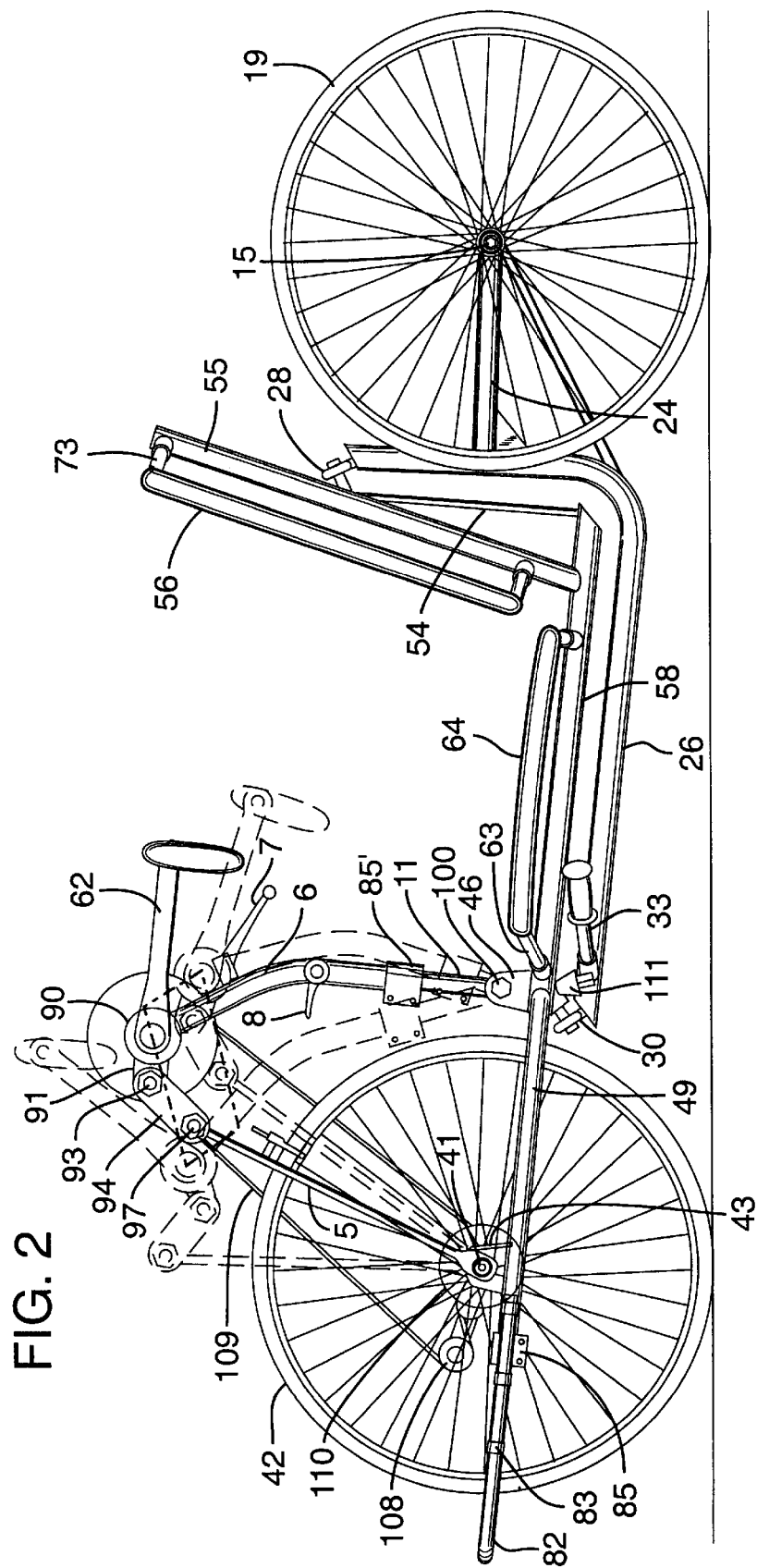
FIG. 2 is a side view of the handcycle of FIG. 1.
Figure 3:
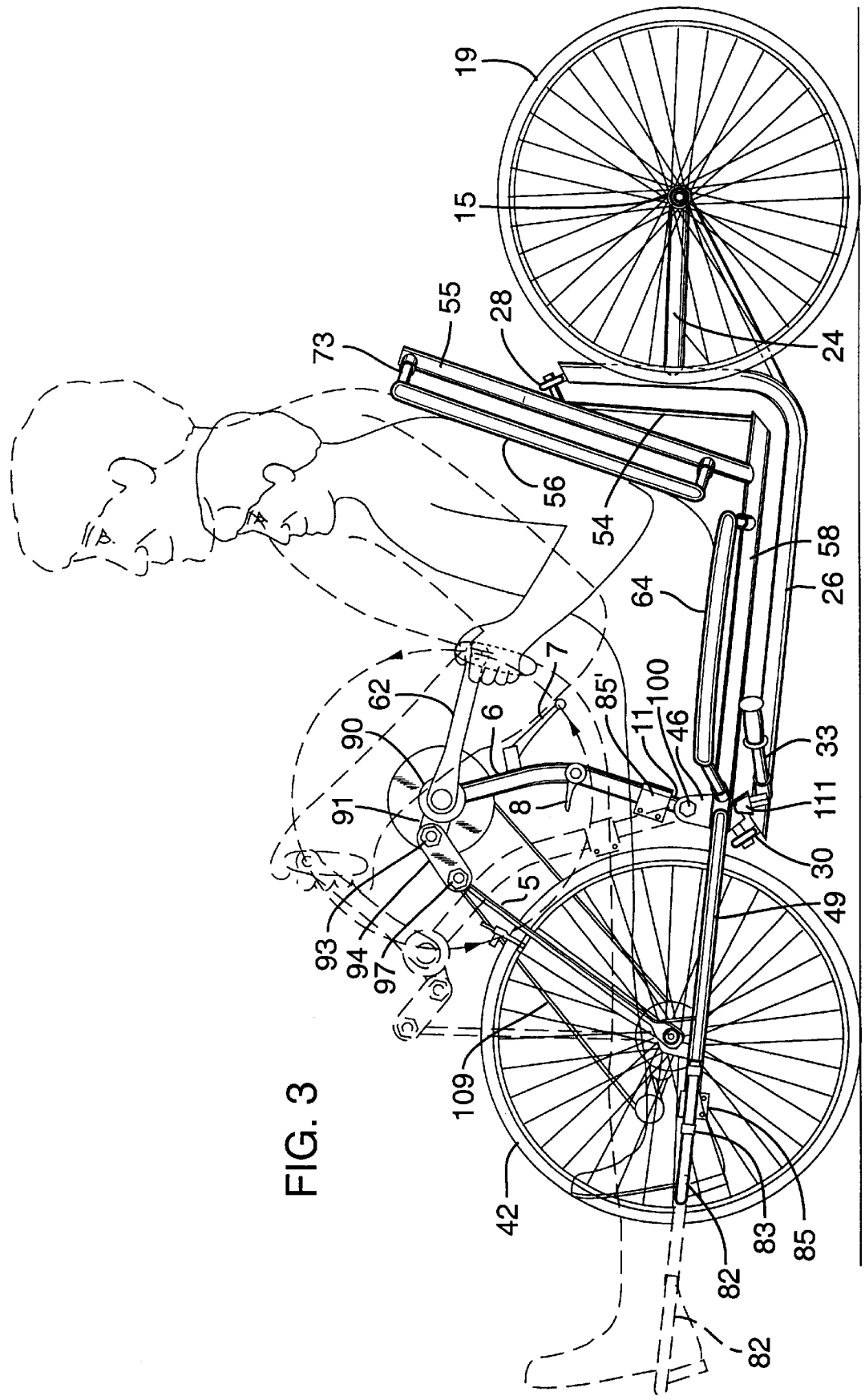
FIG. 3 is a side view and detailed view of the crank arm and foot support positioning assemblies.
Figure 6:
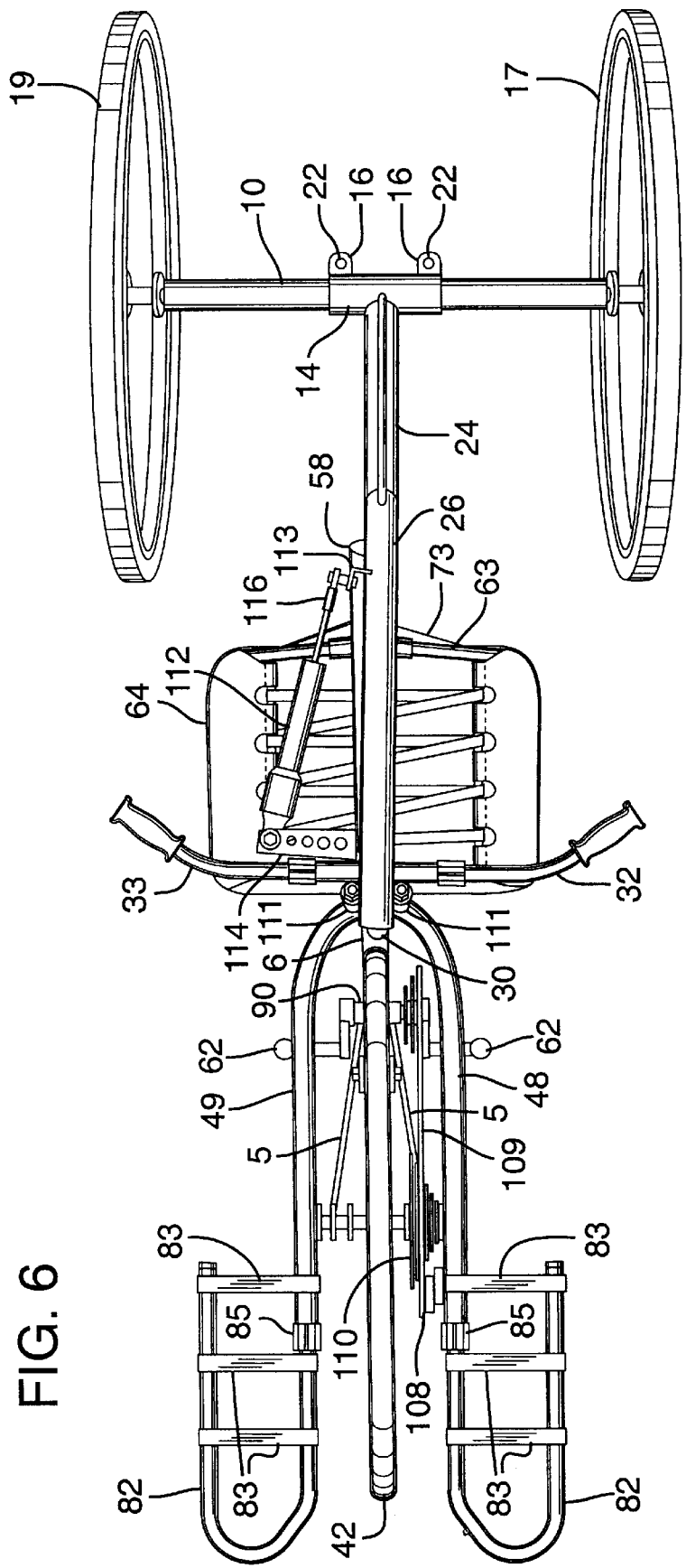
FIG. 6 is a bottom view of the handcycle of FIG. 1.

Referring to the drawing figures, the tricycle 50 of the present invention is comprised of a unified rear body member 40 and a unified front body member 80. The rear body member 40 includes a frame having a straight wheel support tube 10 which is attached to rear body member 12 by passing through a slightly larger tube 14 which has a longitudinal split with two clamping bosses attached slightly inboard of each end of the tube with a shouldered boss 18 on the top and a threaded boss 16 on the bottom located in such a manner that screw 22 squeezes the top boss 2 toward the bottom boss 21 causing the tabular cross section to decrease in size and clamp the tube 10 securely in place. This means allows for tube 10 to be centered relative to the longitudinal axis of the vehicle and rotated about its own longitudinal axis to allow for toe-in and toe-out of the rear wheels. The outer ends of the wheel support tube 10 receive axles 15 which are rotatably connected to two wheels 17 and 19 which are supported in spaced relationship and adjusted as mentioned above for parallel movement on the ground. To further explain this aspect, rotation of wheel support tube 10 causes the wheels 17 and 19 to toe-in or toe-out. Rotating wheel support tube 10 forward causes the wheels to toe-in and rotating wheel support 10 rearward causes the wheels to toe-out. For proper tire wear and reduced drag on the vehicle the rear wheels must have neither toe-in or toe-out. When a punch mark on the support tube 10 is aligned with a small "v" shaped notch 23 on clamp tube 14, the rear wheels are properly aligned. In the present invention the rear wheels are attached to the inserts in the wheel support by means of threaded axles. Clamping tube 14 is welded to a forwardly and slightly upwardly projecting tube 24 which in turn is welded to "L" shaped tube 26 which has a vertical leg representing the short leg of the "L" projecting upward from the attachment point of tube 24 and horizontal leg representing the long leg of the "L" projecting forward and slightly upward from the lower end of the vertical leg of the "L". A spherical rod-end 28 is located at the top end of the tube 26 and another spherical rod end 30 is located at the forward end of tube 26. A first pivotal connection is provided on the upper end of "L" tube 26 at the spherical rod-end 28 and a second pivotal connection is provided forward and downward on the forward end of "L" tube 26 at spherical rod-end 30. A pair of handlebars 32 and 33 are attached to the forward end of "L" tube 26 just rearward of the forward spherical rod end.

The front body member 80 includes an axle 41 supporting a front wheel 42. A rigid fork shaped support straddles the front wheel 42. Two metal plates "drop-outs" 43 are attached to each tubes 48 and 49 respectively in line with and just below the axle 41 with vertical slots that secure axle 41. The right side plate attaches to bar 48 and also supports the lower derailleur 108. Bar 48 extends forward from the right side plate 43 a distance equal to about two thirds the radius of the front wheel 42 and rearward of the right side plate 43 to behind the front wheel where it bend inwards in the same plane and attaches to the junction of adjustment flange 46 and the main front frame structural member 58. Bar 49 begins directly opposite bar 48 at the junction of the adjustment flange and the main front frame structural member 58 and proceeds forward parallel to bar 48 in the horizontal plane to a place the same distance from the adjustment flange as the end of bar 48. The main front frame structural member 58 extends rearward from the adjustment flange. Bar 55 attaches to the top of the main front frame structural member 58 approximately three inches from its rearward end and extends upward and rearward to form the spine of the backrest. Bar 54 attaches to the top, rearward most end of the main front frame structural member 58 and extends upward and attaches to bar 55 just below the connection of the rear pivot point 28. The connection of bars 54,55 and 58 form a triangle for the purpose of increasing frame rigidity between bar 55 and the main front frame structural member 58. The intent of the structure of bars 54, 55 and 58 is to minimize flexing of the front frame when the rider's back pushes against bar 55 as the opposite reaction induced by the rider pushing against the hand cranks 62. Two pairs of short sections of tubing 59 are attached directly opposite each other, equally spaced, and to both the right and left side of the main front frame member 58 extending slightly upward. Two "U" shaped tubes 63 are telescopically inserted into short tubing sections 59 on the left and right side of the front frame. A cloth material 64 is attached to "U" shaped members 63 in such a manner to form a seat. The rider's weight upon the seat material 64 causes the inclined "U" shaped tubes 63 to be forced further into short tubing sections 59 holding the seat bottom in place. Similarly two pairs of short tubing sections 71 are attached opposite each other and equidistant apart to seat back 55. Two "U" shaped tubes 73 are telescopically inserted into short tubing sections 71 on the left and right side of tubing section 54. A cloth material 75 is attached to the two "U" shaped tubes 73 in such a manner as to form the seat back. As with the seat bottom, the rider's weight against the seat back forces the "U" shaped tubes further into short tubing sections 71 holding the seat back in place.

Combined footrests and leg supports 82 telescope in a forward and rearward direction within tubing 48 and 49 respectively. Leg support straps 83 attach to footrests 82 and tubing 48 or 49 to form a sling for the purpose of supporting the rider's leg and foot. Straps are the preferred method or leg support in this case, however, any means of supporting the rider's legs at the rear of the "U " shape 82 would work as well or even closing the back of the "U" shape 82 to make a long rectangle that supports the rider's foot and calf. The combined footrest and leg supports move forward and rearward to accommodate different size riders or similar size riders with different leg lengths. Clamp 85 is slotted on its length and journaled with a larger hole in one end and smaller hole in the other end. Clamp 85 is then placed with the larger hole over tube 48 or 49. Tube section 82 is bent in a "U" shape with one leg of "U" telescopically inserted the smaller hole in clamp 85 and the clamp and "U" shape are then inserted telescopically into tubular section 48 or 49. Telescoping the "U" shape is the preferred means of adjustment, however brackets to 82 that can be moved forward or rearward relative to tubes 48 or 49 would also work as well.

Conventional bicycle cranks 62 are rotatably connected to a conventional bicycle bottom bracket 90 with internal spindle and bearings. A pair of identical plates 91 are attached to bottom bracket 90 and extend forward approximately one inch. Plates 91 are attached equidistant left and right from the longitudinal axis of the vehicle and each plate has a hole drilled in it with the centerline of each hole coincident with a central axis passing through both plates. Bolt 93 attaches two linkage arms 94 to plates 91 by means of passing through a journaled hole in one end of each linkage arm and through the holes in plates 91. A spacer 95 concentric with the bolt 93 is positioned between plates 91 and the linkage arms 94. A locking nut is placed on the bolt after the bolt is passed through the linkage arms, plates and spacer and tightened to hold the assembly rigid after final adjustment of the crank arm position. A bolt 97 passes through the opposite end of linkage arms 94 and through a journaled boss 99 with a locking nut threaded onto the end for the purpose of tightening this assembly after final adjustment of the crank arm position, Tubular section 2 rigidly attaches to boss 99 and extends downwards towards the axis of wheel 42, The ends of tubular section are flattened and a slot is journaled into the flattened end for the purpose of sliding over front wheel axle 41. Tubular section 5 attaches to boss 99 directly opposite tubular section 2 and extends downward in the same plane towards the front wheel axle 41. Similarly to tubular section 2 the end of the section is flattened and journaled for the purpose of sliding over front wheel axle 41, Tubular section 6 attaches rigidly to boss bottom bracket 90 and extends downward and rearward towards adjustment flange 46, Conventional bicycle brake lever 7 and shift levers 8 are rigidly attached to tubular section 6. The end of tubular section 6 is slotted and clamp 85' is concentrically slipped over the end. Clamp 85' is slotted and journaled with a slightly larger diameter on the top end and fits snugly over tubular section 6. Clamp 85' is slotted and journaled with a slightly smaller diameter on the opposite end. Tubular section 11 fits telescopically into clamp 85' and tubular section 6. The opposite end of tubular section 11 rigidly attaches to boss 20, FIG. 4, The boss end of tubular section 11 fits between the plates on adjustment flange 46. Bolt 100 passes through the plates on adjustment flange 46, through boss 20 and is secured with a locking nut. Tightening of bolt 100 and locking nut holds tubular section 11 and boss 20 rigidly in place after adjustment of the crank arm position.

A conventional caliper brake 105 is attached. A front derailleur 107 is attached to tubular structure 6 and rear derailleur 108 is attached to right side drop out. Conventional bicycle chain 109 connects the crank arm 62 to the drive sprockets 110. In extreme adjustment positions it may require adding or subtracting links from the chain 109.

Adjustable rubber snubbers 111 are attached to the topside of tubular section 26 on the rear frame section 40. When the handcycle is turned the front frame leans left or right. The rubber snubbers 111 come in to contact with the rear ends of tubes 48 and 49 where they are welded to adjustment flange 46 and limit the articulation of the frame. The rubber snubbers may be screwed into or out of their mounting bosses for the purpose of adjustment. Flat washers may be placed beneath the snubbers and their mounting bosses to act as shims or a jam nut to keep them firmly in place. Steering dampener 112 is attached to plate 113 on the rear frame tubular section 26. A flat plate 114 is attached to the front frame main support member 58 just rearward of the adjustment flange 46. A serious of holes are placed in the plate 114 to permit adjustment of the steering resistance provided by the dampener. A spherical rod end 116 is attached to the end of the rod of the dampener 112. A bolt and lock nut attach the spherical rod end of the dampener to plate 113 on the rear frame. Similarly a bolt and locknut attach the cylinder end of the dampener to the adjustment plate 114 on the front frame. The rubber snubbers 111 limit the articulation of the frame so that the dampener is never subjected to complete compression or extension.

What is claimed:

1. A hand pedaled device comprising:

a frame;

a wheel mounted on the frame;

a hand crank mounted on the frame;

a drive member connecting the wheel and hand crank whereby manual rotation of the hand crank rotates the wheel;

said hand crank mounted to the frame by a pair of arm segments each having opposed first and second ends, each first end of the pair of arm segments connected to the hand crank and each second end connected to the frame at spaced apart points of connection and each of said arm segments defining a length between said hand crank and said points of connection for the pair of arm segments;

and releasable locking means for releasably locking the arm segments at a specified distance between said points of connection whereby with the locking means released, the crank arm position relative to the frame can be selectively adjusted to any horizontal or vertical position within a range of movement as permitted by the pair of arm segments.

2. A hand pedaled device as in claim 1 wherein one arm segment is comprised of a telescoping section and the other arm segment is comprised of a substantial fixed length releasably pivotally attached to linkage arms, said linkage arms releasably pivotal about respective ends, one said pivotal end connected to the hand crank; said releasable locking means clamping the telescoping section whereby with the locking means released the hand crank position relative to the frame can be selectively adjusted to any horizontal or vertical position within a range of movement as permitted by the cooperative lengthening and shortening of the telescoping section and the lengthening and shortening provided by rotation of the linkage arms.

3. A hand pedaled device as in claim 1 comprising:

a frame;

a single front wheel;

a drive member connecting the front wheel and said hand crank whereby manual rotation of the hand crank rotates the front wheel; and a pair of rear wheels.

4. A hand powered cycling device as in claim 1 including a seat, a back rest and a back rest connection all mounted to the frame whereby a person seated in the seat manipulates the hand crank for providing dive power to the wheel and in doing so imparts a rearward thrust against the back rest of the seat;

said back rest comprised of an upwardly directed elongated support member connected to the frame at a bottom end and subject to flexing along a vertical length, and a rigidifying support member extended from the frame at a position on the frame spaced from the bottom end and connected to the support member upwardly from the bottom end to thereby form a rigidifying triangular support to resist flexing of the back rest when subjected to said rearward thrust.

5. A hand pedaled device as in claim 4 wherein said wheel is a single front wheel, the device comprising:

a frame;

a drive member connecting the front wheel and hand crank whereby manual rotation of the hand crank rotates the front wheel; and a pair of rear wheels.

6. A hand powered cycling device comprising:

a frame;

a front wheel mounted on the frame;

a rear wheel mounted on the frame;

a hand crank mounted on said frame and a drive member connecting said hand crank and one of said wheels for imparting rotative driving of said wheel;

a seat on said frame and the frame, wheels and seat in combination structured to provide seating of a person with the person's legs and feet extended forwardly at each side of the front wheel;

a foot and leg support at each side of the front wheel including a forward most cross brace positioned for engagement by the bottom of the person's feet, said support structured for adjustment of the cross brace to position the cross brace as required for engagement by the bottom of the person's feet for persons having different body lengths;

said foot and leg support at each side of the front wheel further comprised of a forwardly projected member;

a rearwardly projected member laterally opposite the forwardly projected member;

and a secondary cross member located rearward of the front most cross brace.

7. A hand pedaled device as in claim 6 comprising:

a frame;

said front wheel being a single front wheel;

a drive member connecting the front wheel and hand crank whereby manual rotation of the hand crank rotates the front wheel; and a pair of rear wheels.

8. A hand powered cycle as in claim 6 wherein a foot and leg support at each side of the front wheel are comprised of a "U" shaped member, said "U" shaped member structured for lengthwise adjustment; and a cross support structured for support of the person's leg.

9. A hand powered cycling device comprising:

a frame;

a front wheel, a rear wheel, a hand crank and a seat including a back rest, all mounted to the frame whereby a person seated in the seat manipulates the hand crank for providing drive power to one of the wheels;

said back rest including a first spine member extended upwardly from the frame, a pair of U-shaped brackets having upper, lower and center legs extended from opposite sides of the first spine member at a slight forwardly directed angle that positions the center leg substantially parallel to and spaced from the first spine member and slightly forward of the first spine member, each of said lower and upper legs having distal ends loosely coupled to the first spine member and readily decoupled by withdrawing each bracket laterally away from the first spine member;

said seat bottom including a second spine member extended forwardly, a pair of U-shaped brackets having front, back and center legs extended from opposite sides of the second spine member at a slight upwardly directed angle that positions the center leg substantially parallel to and spaced from the second spine member and slightly above the second spine member, each of said front and back legs having distal ends loosely coupled to the second spine member and readily decoupled by withdrawing each bracket laterally away from the second spine member;

a back rest cover and a seat bottom cover attached to each center leg of the brackets, respectively and drawn taut between said center legs, said covers as attached preventing withdrawal movement of the brackets and requiring removal of the cover for decoupling of the brackets.

10. A hand powered cycling device comprising:

a frame; a front wheel, a pair of rear wheels, a hand crank and a seat all mounted to the frame and enabling a person seated in the seat to manipulate the hand crank providing drive power to the front wheel;

said frame including a front frame portion and a rear frame portion, said front frame portion overlying in part the rear frame portion and the overlying parts of the front and rear frame portions connected together by two spaced apart front and rear pivotal connections, the rear pivotal connection positioned higher than the front pivotal connection and the two pivotal connections forming an axis around which the front frame portion pivots relative to the rear frame portion;

said front frame portion defining a path of pivotal movement around said axis left and right of a centered position, a right and left resistively collapsible bumper mounted between the rear and front frame portions and projected into the path of movement of the frame portions, said bumpers while being collapsed increasingly resisting but permitting relative movement of the front frame portion and defining right and left limits of relative movement of said front frame portion.

11. A hand powered cycling device as in claim 10, wherein said rear wheels cambered with the tops of the rear wheels closer together than the bottoms of the rear wheels in a desired position and the rear wheels are interconnected together and connected to the frame through a fixed axle, the connection to the frame provided by a clamp fixed to the frame and encircling at least in part the axle and releasably clamping the fixed axle to the frame, said clamp provided with a locating mark and said axle provided with an indexing mark whereat the alignment of the locating mark and the indexing mark provides the desired axle position whereat the cambered wheels are positioned as desired.

12. A band powered cycling device as in claim 10 wherein said seat includes a back rest and a back rest connection all mounted to the front frame whereby a person seated in the seat manipulates the hand crank for providing drive power to one of the wheels and in doing so imparts a rearward thrust against the back rest of the seat; said back rest comprised of an upwardly directed elongated support member connected to the front frame at a bottom end and subject to flexing along a vertical length and a rigidifying support member extended from the front frame at a position on the front frame spaced from the bottom end and connected to the support member upwardly from the bottom end to thereby form a rigidifying triangular support to resist flexing of the back rest when subjected to said rearward thrust.

13. A hand power cycling device comprising:

a frame; a front wheel, a pair of rear wheels, a hand crank and a seat all mounted to the frame and enabling a person seated in the seat to manipulate the hand crank providing drive power to the front wheel;

said frame including a front frame portion and a rear frame portion, said front frame portion overlying in part the rear frame portion and the overlying parts of the front and rear frame portions connected together by two spaced apart front and rear pivotal connections, the rear pivotal connection positioned higher than the front pivotal connection and the two pivotal connections forming an axis around which the front frame portion pivots relative to the rear frame portion;

said front frame portion defining a path of pivotal movement around said axis left and right of a centered position, a right and left resistively collapsible bumper mounted to the rear frame portion and projected into the path of the movement of the front frame portion said bumpers while being collapsed increasingly resisting but permitting relative movement of the front frame portion and defining right and left limits of relative movement of said front frame portion.

\* \* \* \* \*